3,093,590
TRICHLOROCYANURIC ACID BLEACH WITH SPRAY-DRIED BASE
Robert C. Ferris, Downey, Calif., assignor to Purex Corporation, Ltd., South Gate, Calif., a corporation of California
No Drawing. Filed Aug. 8, 1956, Ser. No. 602,938
5 Claims. (Cl. 252—99)

This invention has to do in certain of its aspects, with improved dry bleaching and disinfecting compositions employing generally the combination of water soluble inorganic salts and trichlorocyanuric acid (known also as trichloroisocyanuric acid and trichloroiminocyanuric acid) as a source of bleaching or disinfecting chlorine upon dissolution of the acid in water. In other of its aspects, the invention is concerned with the provision of a new and improved inorganic salt spray-dried base for admixture with bleaching or disinfecting materials such as trichlorocyanuric acid, and which, by reason of its physical form and particular composition, has significantly beneficial relation to the trichlorocyanuric acid in obviating the later discussed odor condition, as well as benefiting the entire composition in a number of respects, including the promotion of its quick solubility and accelerated release of chlorine from the acid in water solution, and providing a uniform and free-flowing admixture rendering the composition especially desirable for use in the field of houshold bleaches and disinfectants.

Speaking first with particular reference to problems and conditions arising through the use of trichlorocyanuric acid as a bleaching agent, it has been proposed in the past to compound this acid with water soluble alkaline salts such as alkali metal and ammonium phosphates, and it has been represented that trichlorocyanuric acid admixed with these salts produced compositions that are stable with respect to the acid. Actual experience with many such compositions has demonstrated that they possess a kind and degree of instability which renders them unacceptible for general consumer use. The instability and undesirability from a consumer standpoint results from the apparent tendency, under ordinary atmospheric and other conditions to which a packaged composition of the acid-alkaline salts would be subjected, for the trichlorocyanuric acid to undergo partial decomposition which is catalyzed or otherwise accelerated by the admixed salt component. The result is an evolution from the trichlorocyanuric acid of highly noxious and otherwise objectionable volatiles which appear to be such nitrogenous compounds as $NH_2Cl$ and $NCl_3$.

One major object of the invention is to incorporate in the product a salt complex base resulting from the drying of an aqueous slurry of an alkali metal silicate and one or more water soluble salts. This base serving among various functions as an odor stabilizing or deodorizing agent, the effect of which is to convert the otherwise noxious volatiles to inoffensive decomposition products of such compounds as $NH_2Cl$ and $NCl_3$. While in the broad contemplation of the invention, the base may be formed by any suitable method of drying the slurried salt mixture, I prefer to spray dry the slurry to achieve the particular benefits of quick solubility of the salt complex and free flowability of the product admixture that results from the base being in the form of hollow bead-like particles. Also the presence of the alkali metal silicate in the spray dried material gives to the beads desirably increased strength and resistance to dry disintegration or dusting.

At this point it may be mentioned that the proportion of trichlorocyanuric acid to be admixed with the salt complex to form a disinfecting or bleaching product is not critical, and may vary between concentrations as low as around one percent, where the product is designed to serve as a relatively mild disinfectant, to percentages as as high ninety-nine percent, where potent bleaching power is desired.

With further and more specific reference to the base, to which I refer hereinafter preferably as being spray-dried, it is found that the alkali metal silicates, i.e., sodium silicate or potassium silicate, when dried from solution with one or more alkaline or builder salts, are capable uniquely of serving the dual functions of a deodorant or odor stabilizing agent in relation to the noxious decomposition products of the trichlorocyanuric acid, and, as a binder for adhering with the builder salts in exceptionally strong spray-dried hollow bead form. It is found that trichlorocyanuric acid in finely granular or pulverulent form remains in uniform admixture with the spray-dried base, and that intimacy of contact exists by reason of the tendency of the acid to coat and adhere to the spray-dried particles. Concerning the quantity of alkali metal silicate that may be present in relation to the acid or the total composition of the product, very small amounts of silicate will suffice for stabilization of the acid, and the major factor is the amount of alkali metal silicate that will serve most effectively to adhere the alkaline or filler salt component in hollow bead form, with due regard to the desirable percentage of such salt or salts in the all-over composition. Ordinarily, it will be preferred to use the alkali metal silicate in quantities between about three to thirty percent of the total salt content of the spray-dried beads.

As to the alkaline or filler water soluble salt content of the base, the latter may be formed by spray drying an aqueous slurry of the alkali metal silicate and any or mixtures of the alkali metal water soluble salts such as the alkali metal phosphates, including tripolyphosphate, pyrophosphate, orthophosphate, and hexameta phosphate, as well as such other readily soluble salts as the alkali metal sulphates, carbonates and chlorides, e.g., sodium sulphate, sodium carbonate and sodium chloride.

It will be understood that the invention includes among its more specific objectives the manufacture of a spray-dried base composed of one or a mixture of such readily water soluble salts as the alkali metal phosphates, sulfates, and chlorides integrated in exceptionally strong hollow bead form by the use of an alkali metal silicate as a binder, the resulting product having ready water solubility and the capacity for improving the performance of admixed trichlorocyanuric acid or other water soluble salt bleaches or disinfectants.

The invention marks certain important discoveries in relation to odor stabilization of the trichlorocyanuric acid. Heretofore it has been proposed to use trichlorocyanuric acid in dry mixture with various water soluble salts including the alkali metal silicates, without however preparing the salt component by drying an aqueous slurry of alkali metal silicate and water soluble alkaline salt. Now I have determined that the alkali metal silicates when used in various substantial proportions, are incapable, in the presence of the alkali metal salts with which the silicates are not complexed or coprecipitated, of odor stabilizing the trichlorocyanuric acid. As will later appear in reference to certain specific examples, trichlorocyanuric acid compositions in which the silicate is complexed with the builder salt are odor stable, whereas identically the same compositions in which the salt components are physically and chemically separate are unstable and definitely lachrymatory. All the reasons for such differences in the odor stabilizing behavior of the silicate are not understood and could not be predicted. Apparently, in the conditions contemplated by the invention, the silicate and builder salt in drying out of the same solution, combine physically or chemically in a form, which I term a "complex" in the absence of complete certainty, which functions in the nature of a catalyst toward odor stabilization of the acid and in so doing displays properties that are not possessed by the dry mixed but otherwise chemically and physically separate silicate and builder salt. So effective is the salt complex that I have been able to odor stabilize the acid using any of the various commercial grades of sodium silicates with the builder salt.

The invention will be further understood with respect to illustrative and practicably usable embodiments, and important properties and functions of the alkali metal silicate-salt complex in the spray-dried beads, from the following examples showing the components in weight percentages. Examples I through V typify the base itself by reference to the starting chemicals which are slurried and dried. These become examples of bleaches and disinfectants when in each example, 10% trichlorocyanuric acid by weight of the spray-dried base, is uniformly mixed therewith.

EXAMPE I

| | Percent |
|---|---|
| "N" grade sodium silicate (anhydrous basis)[1] | 15.0 |
| Sodium tripolyphosphate | 10.0 |
| Sodium sulfate | 75.0 |

[1] "N" grade silicate has an approximate $Na_2O:SiO_2$ ratio of 1:3.22. A syrupy liquid containing 62.4% water.

This base is essentially of inorganic nature, but may contain small amounts of optical dyes, dedusting and surface-active agents, ordinarily known to the trade.

EXAMPE II

| | Percent |
|---|---|
| Metso 99 [1] (anhydrous basis) | 9.0 |
| Sodium sulfate | 88.0 |

[1] Metso 99 is a hydrous sodium silicate powder which has an $Na_2O:SiO_2$ ratio of 3:2. The water content is 38.7%.

This base is essentially inorganic, but preferably contains up to 4% of a surface-active agent.

EXAMPLE III

| | Percent |
|---|---|
| "D" grade sodium silicate [1] (anhydrous basis) | 10.0 |
| Sodium sulfate | |

[1] "D" grade silicate is a syrupy solution which has an $Na_2O:SiO_2$ ratio of 1:2. The water content is 56.5%.

EXAMPLE IV

| | Percent |
|---|---|
| Metso 99 (anhydrous basis) | 6.0 |
| Sodium tripolyphosphate | 10.0 |
| Sodium sulfate | 81.0 |

EXAMPLE V

| | Percent |
|---|---|
| "D" grade silicate (anhydrous basis) | 3.0 |
| Sodium tripolyphosphate | 17.0 |
| Sodium sulfate | 77.0 |

These bases (Examples III, IV and V) are essentially inorganic and may contain up to 4% surface-active agent.

EXAMPLE VI

A base resulting from spray drying an aqueous slurry of:

| | Parts |
|---|---|
| Sodium silicate ("N" grade, anhydrous basis) | 20 |
| Tri sodium phosphate | 40 |
| Sodium carbonate | 31½ |
| was uniformly mixed with | |
| Trichlorocyanuric acid | 8½ |

The resulting product is odor stable and commercially acceptable.

EXAMPLE VII

A base resulting from spray drying an aqueous slurry of:

| | Parts |
|---|---|
| Sodium silicate ("N" grade anhydrous basis) | 15 |
| Tri sodium polyphosphate | 40 |
| Sesqui-carbonate | 30 |
| Dodecylbenzenesulfonate | 6½ |
| was uniformly mixed with | |
| Trichlorocyanuric acid | 8½ |

The resulting product is odor stable and commercially acceptable.

Formulations made in exact correspondence with Examples VI and VII simply by dry mixing the corresponding anhydrous silicate, phosphate, carbonate and trichlorocyanuric acid, early after preparation develop and continue to evolve highly irritating odors.

As long as the base material is essentially inorganic and contains silicate to achieve the desired physical and chemical stability, the balance of the composition may consist of water soluble inorganic salt. Small amounts of additive materials such as surfactants, fluorescent dyes, perfumes, etc., may be used. The advantageous physical properties of the base can be demonstrated by the following type of test:

A 20 gram sample of the product placed in a 100 cc. graduated cylinder is vibrated sufficiently to attain normal packing. The volume occupied by the product is then recorded. The sample is then vibrated for ten minutes at a relative high frequency on a standard drum vibrator. The volume of the sample is again recorded and the percent breakdown is calculated. The following example is indicative of the results obtained:

Table I

| Formula | Percent breakdown |
|---|---|
| (1) Sodium tripolyphosphate, 25%; sodium sulfate, 75% | 14 |
| (2) Sodium silicate ($Na_2O:SiO_2=1:3.22$), 15%; sodium sulfate, 85% | 5 |
| (3) Sodium silicate ($Na_2O:SiO_2=3:2$), 9%; sodium sulfate, 91% | 6 |

When desirable for inclusion in the base, the organic surface active materials mentioned above, and whose quantity is limited to not in excess of about 4% of the base, may be any of the known non-ionic or anionic detergents, such as the alkali metal lauryl sulfates and alkyl aryl sulfonates.

It will be understood that the base composition does not adapt itself for ordinary uses of detergents, since it may contain to surfactant, and that the utility of the base arises by reason of its being essentially inorganic and its having the properties given it by reason of the salt-alkali metal silicate composition.

This application is a continuation-in-part of my application Serial No. 531,275, filed August 29, 1955 (now abandoned), on "Dry Bleach Composition and Spray Dried Base."

I claim:

1. As a product, a uniform mixture of trichlorocyanuric acid which in itself gives off lachrymatory chloramine volatiles, and a silicate-soluble salt complex in hollow bead form acting to render the product unobjectionably lachrymatory, said salt complex resulting from the spray drying of an aqueous slurry containing a mixture of an alkali metal silicate of the group consisting of sodium silicate and potassium silicate, and a water soluble salt of the class consisting of alkali metal phosphates, sulfates, carbonates and chlorides.

2. The product as defined by claim 1, in which said silicate constitutes on an anhydrous weight basis between about 3% to 30% of said complex.

3. The product as defined by claim 2, in which said mixture contains also an organic surface active agent in an amount not exceeding about 4% by weight of the beads.

4. The product as defined by claim 1, in which said complex consists essentially of said alkali metal silicate and an alkali metal phosphate.

5. The product as defined by claim 1, in which said complex consists essentially of said alkali metal silicate and an alkali metal sulfate.

References Cited in the file of this patent

UNITED STATES PATENTS

| | | |
|---|---|---|
| 2,308,992 | Mertens | Jan. 19, 1943 |
| 2,515,577 | Waldeck | July 18, 1950 |
| 2,578,270 | Strain | Dec. 11, 1951 |
| 2,607,738 | Hardy | Aug. 19, 1952 |
| 2,706,178 | Young | Apr. 12, 1955 |
| 2,712,529 | Mills et al. | July 5, 1955 |
| 2,795,556 | Quinn | June 11, 1957 |
| 2,796,429 | Kreps et al. | June 18, 1957 |
| 2,809,937 | Gray | Oct. 15, 1957 |

FOREIGN PATENTS

| | | |
|---|---|---|
| 652,521 | Great Britain | Apr. 25, 1951 |